United States Patent
Murata et al.

(10) Patent No.: US 10,549,463 B2
(45) Date of Patent: Feb. 4, 2020

(54) BASE FOR INJECTION MOLDING MACHINE

(71) Applicant: NISSEI PLASTIC INDUSTRIAL CO., LTD., Hanishina-gun, Nagano-ken (JP)

(72) Inventors: Atsushi Murata, Nagano-ken (JP); Daiki Tanemura, Nagano-ken (JP); Satoshi Hoshino, Nagano-ken (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 16/000,113

(22) Filed: Jun. 5, 2018

(65) Prior Publication Data

US 2018/0370102 A1 Dec. 27, 2018

(30) Foreign Application Priority Data

Jun. 22, 2017 (JP) .................................. 2017-121891

(51) Int. Cl.
*B29C 45/17* (2006.01)
*B29C 45/64* (2006.01)

(52) U.S. Cl.
CPC .......... *B29C 45/1761* (2013.01); *B29C 45/64* (2013.01); *B29C 2045/1765* (2013.01); *B29C 2045/1767* (2013.01)

(58) Field of Classification Search
CPC ........ B29C 45/1761; B29C 2045/1765; B29C 2045/1767
See application file for complete search history.

(56) References Cited

U.S. PATENT DOCUMENTS

| | | | |
|---|---|---|---|
| 3,674,400 A * | 7/1972 | Sauerbruch et al. | ................ B29C 45/1761 425/225 |
| 4,099,905 A * | 7/1978 | Nash ................... | B29C 45/1761 425/542 |
| 4,564,348 A * | 1/1986 | Hehl ...................... | B29C 45/17 198/536 |
| 6,866,500 B2 * | 3/2005 | Kishi .................. | B29C 45/1761 425/450.1 |
| 7,140,872 B2 * | 11/2006 | Nishimura .......... | B29C 45/1761 425/589 |

FOREIGN PATENT DOCUMENTS

JP 2000-84979 * 3/2000

* cited by examiner

*Primary Examiner* — James P Mackey
(74) *Attorney, Agent, or Firm* — Adams & Wilks

(57) ABSTRACT

A base for an injection molding machine has two side frames extending parallel with the axis of a drive actuator. Each of the side frames includes a lower flange supported by a bed, an upper flange disposed parallel with the lower flange, at least two webs connecting the upper flange and the lower flange, and a web reinforcing member fixed to the webs and penetrating through the webs. The side frames each have stiffeners connected between the lower and upper flanges and to one of the webs.

4 Claims, 10 Drawing Sheets

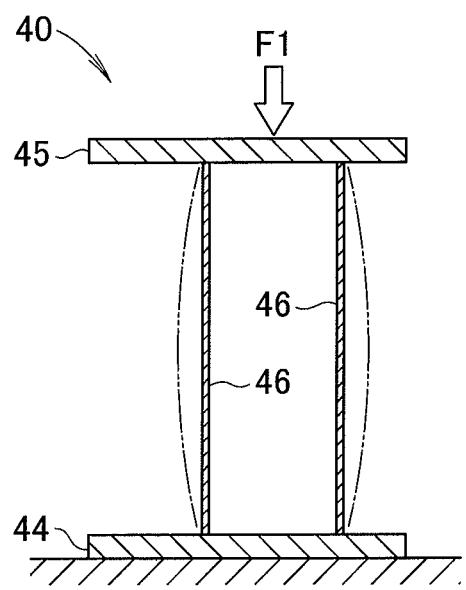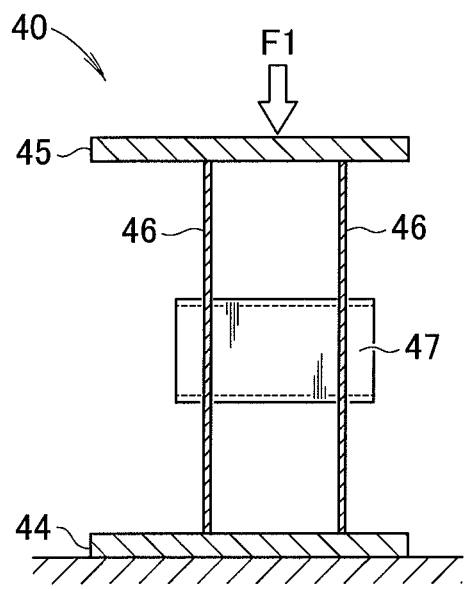
FIG.5A
Comparative Example
FIG.5B
Example

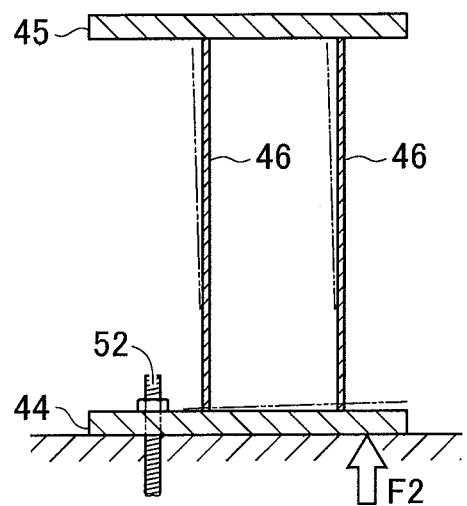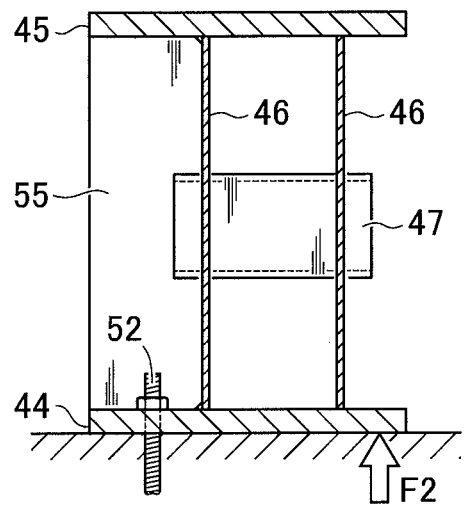
FIG.6A
Comparative Example
FIG.6B
Example

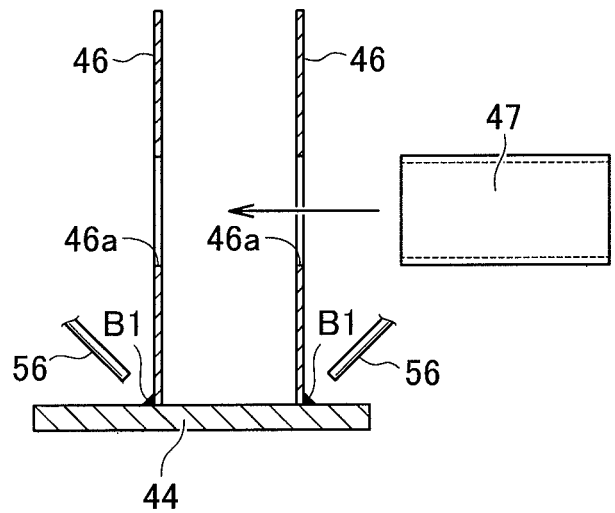
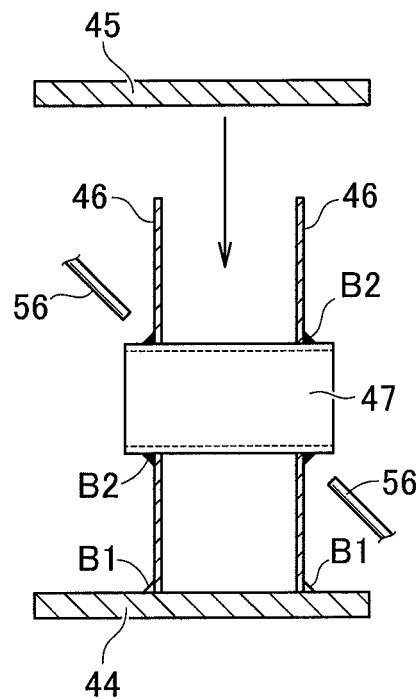
FIG.7A    FIG.7B
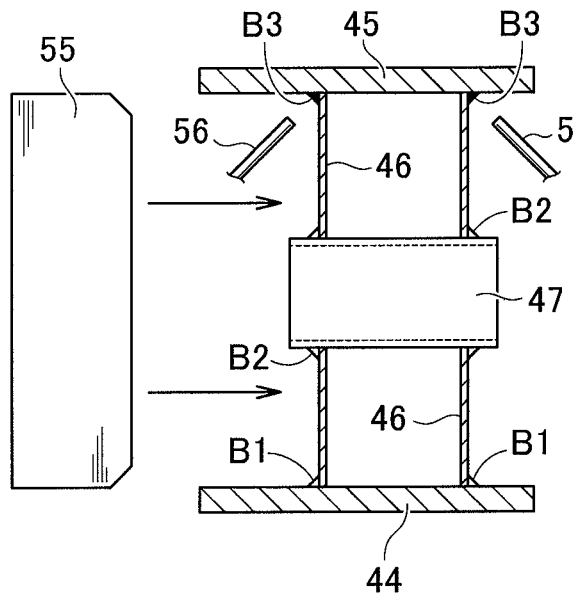
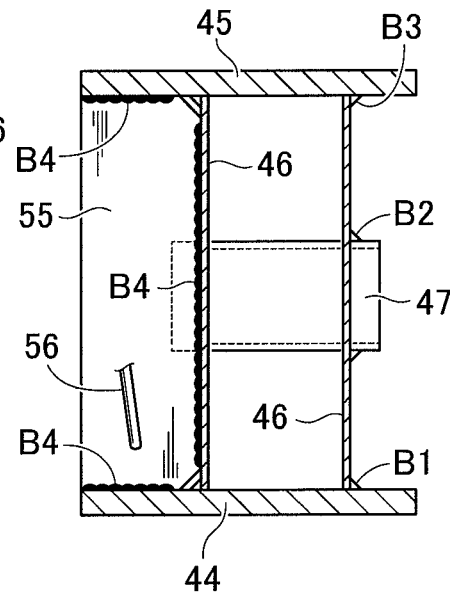
FIG.7C    FIG.7D

BASE FOR INJECTION MOLDING MACHINE

FIELD OF THE INVENTION

The present invention relates to bases used in injection molding machines.

BACKGROUND OF THE INVENTION

A mold clamping unit of an injection molding machine includes a base fixed to a bed or a substructure, a fixed platen fixed onto the base, a pressure receiving platen (or a mold clamping cylinder) disposed parallel with the fixed platen on the base, a tie bar disposed across the fixed platen and the pressure receiving platen, and a movable platen disposed between the fixed platen and the pressure receiving platen and moving on the base while being guided by the tie bar.

The movable platen and the fixed platen are used to clamp a mold.

The base used in the mold clamping unit is required to be rigid enough to withstand mold clamping reaction force. A highly rigid base structure disclosed in JP 3631906 B, for example, is known.

The base structure disclosed in JP 3631906 B will be described with reference to FIGS. 9 and 10.

As illustrated in FIG. 9, a base 100 for an injection molding machine includes a lower flat plate 101, two H-beams 102, 103 disposed on the lower flat plate 101, reinforcing members 104, 105 sandwiched by the H-beams 102, 103, and an upper flat plate 106 disposed on the two H-beams 102, 103. These constituent elements 101 to 106 are joined together by welding or with bolts.

FIG. 10 illustrates the base 100 for an injection molding machine after the joining by welding or with bolts.

The reinforcing member 104 on the nearer side to the viewer in the drawing can be joined to the two H-beams 102, 103 by welding because a welding rod is placed from the nearer side.

On the other hand, it is difficult to join the reinforcing member 105 on the farther side because the reinforcing member 104 on the nearer side is obstructive. For example, the reinforcing member 105 is preliminarily joined to one H-beam 102. The other H-beam 103 is adjusted in position with respect to the reinforcing member 105. The H-beam 103 is fixed to the reinforcing member 105 with bolts. With these processes, the reinforcing member 105 on the farther side can be attached.

These processes require a bolt fastening step in addition to a welding step, resulting in an increase in the number of steps. An increase in the number of steps increases manufacturing cost.

The bolts used for fixing loosen inevitably and are thus required to be fastened periodically. This increases maintenance and inspection cost.

To reduce manufacturing cost and maintenance and inspection cost, it is desired to fix the constituent elements only by welding.

As illustrated in FIG. 9, the H-beam 102 includes a lower flange 102a, an upper flange 102b, and a web 102c connecting these flanges, and similarly, the H-beam 103 includes a lower flange 103a, an upper flange 103b, and a web 103c connecting these flanges.

As illustrated in FIG. 10, the lower flat plate 101 lies on the lower flanges 102a, 103a, and the upper flat plate 106 lies on the upper flanges 102b, 103b. This configuration causes overlapping of members.

The upper flat plate 106 is applied with a downward load and is thus required to have rigidity especially at the center. The center of the upper flat plate 106 is not covered with the upper flanges 102b, 103b, so that support with the upper flanges 102b, 103b cannot be expected. As a measure, the upper flat plate 106 is required to be thickened to enhance rigidity. This results in a heavier upper flat plate 106 in addition to the overlapping members.

Since the known base 100 is rigid but heavy, it is desired to reduce the weight of the base 100, considering manufacturing and transportation costs.

As a substitute for the base for an injection molding machine disclosed in JP 3631906 B, a base for an injection molding machine is needed in which constituent elements can be fixed only by welding and that has light weight on the precondition that a plurality of webs are included.

SUMMARY OF THE INVENTION

An object of the present invention is to provide a base for an injection molding machine in which constituent elements can be fixed together only by welding and that has light weight even when a plurality of webs are included.

According to an aspect of the present invention, a base for an injection molding machine is provided. The base for an injection molding machine includes two side frames extending parallel with an axis of a drive actuator. Each of the two side frames includes a lower flange supported by a bed, an upper flange disposed parallel with the lower flange, at least two webs connecting the upper flange and the lower flange, and a web reinforcing member fixed to the at least two webs while penetrating the at least two webs.

In the present invention, the web reinforcing member penetrates the webs. This penetration allows the web reinforcing member to be welded to the webs from the outer side. Thus, the constituent elements including the lower flange, the upper flange, the webs, and the web reinforcing member can be fixed together only by welding.

The side frame includes the lower flange, the upper flange, the webs, and the web reinforcing member, and thus has no overlapping members, resulting in weight reduction.

According to one aspect of the present invention, a base for an injection molding machine is provided in which constituent elements can be fixed together only by welding and that has light weight even when a plurality of webs are included.

Preferably, the base for an injection molding machine further includes: a slide plate disposed on an upper surface of the upper flange and supporting a movable body moved by the drive actuator, the slide plate including a lateral center positioned offset from a lateral center of the upper flange toward a center of the injection molding machine, in a cross-sectional view of the side frame, and the at least two webs being positioned in correspondence with the slide plate; an anchor bolt hole positioned outside an outermost web between the at least two webs, in the lower flange; and a stiffener attached to the side frame and connected with an upper surface of the lower flange, an outer surface of the outermost web, and a lower surface of the upper flange.

The slide plate disposed on the upper flange is positioned offset from the lateral center of the upper flange toward the center. This configuration causes the lower flange to extend outward, and the anchor bolt hole can be disposed in the extended portion.

The anchor bolt hole disposed on the outer side enables attachment of an anchor bolt and fastening of a nut from the outer side, and thus the side frame is readily fixed to the bed.

Since the lower flange extends outward, the lower flange readily bends or sags. The stiffener is thus placed in a region defined by the upper surface of the lower flange, the outer surface of the outermost web, and the lower surface of the upper flange. Reinforcing effect of the stiffener can enhance bending rigidity and sagging rigidity of the lower flange, the webs, and the upper flange.

Preferably, the injection molding machine includes a mold clamping unit; the mold clamping unit includes: a base for a mold clamping unit fixed to the bed; a fixed platen fixed to the base for a mold clamping unit and supporting a fixed mold; a mold clamping cylinder movably disposed on the base for a mold clamping unit; a mold opening/closing actuator indirectly moving the mold clamping cylinder; a movable platen disposed between the fixed platen and the mold clamping cylinder, supported by the base for a mold clamping unit in a horizontally movable manner, and supporting a movable mold; and a tie bar extending horizontally from the fixed platen through the movable platen and the mold clamping cylinder; and the base for an injection molding machine is the base for a mold clamping unit, the drive actuator is the mold opening/closing actuator, and the movable body is the movable platen.

The base for an injection molding machine is applied to the base for a mold clamping unit.

Preferably, the base for an injection molding machine further includes: a front cross member connecting front ends of the two side frames; and a rear cross member connecting rear ends of the two side frames. This configuration enhances rigidity of the base for a mold clamping unit.

BRIEF DESCRIPTION OF THE DRAWINGS

Some preferred Examples of the present invention will be described in detail below with reference to the attached drawings.

FIG. 5A is an explanatory diagram of action of a web reinforcing member of Comparative Example.

FIG. 5B is an explanatory diagram of action of a web reinforcing member of Example.

FIG. 6A is an explanatory diagram of action of a stiffener of Comparative Example.

FIG. 6B is an explanatory diagram of action of a stiffener of Example.

FIG. 7A is an explanatory diagram of processes from when webs are placed upright on a lower flange until when a web reinforcing member is inserted into the upright webs.

FIG. 7B is an explanatory diagram of processes from when the web reinforcing member is joined to the webs until when an upper flange is placed on the webs.

FIG. 7C is an explanatory diagram of processes until when a stiffener is positioned.

FIG. 7D is an explanatory diagram of a process until when the stiffener is joined.

DETAILED DESCRIPTION OF THE PREFERRED EMBODIMENTS

Embodiments of the present invention will be described below with reference to the attached drawings.

Figure 1:
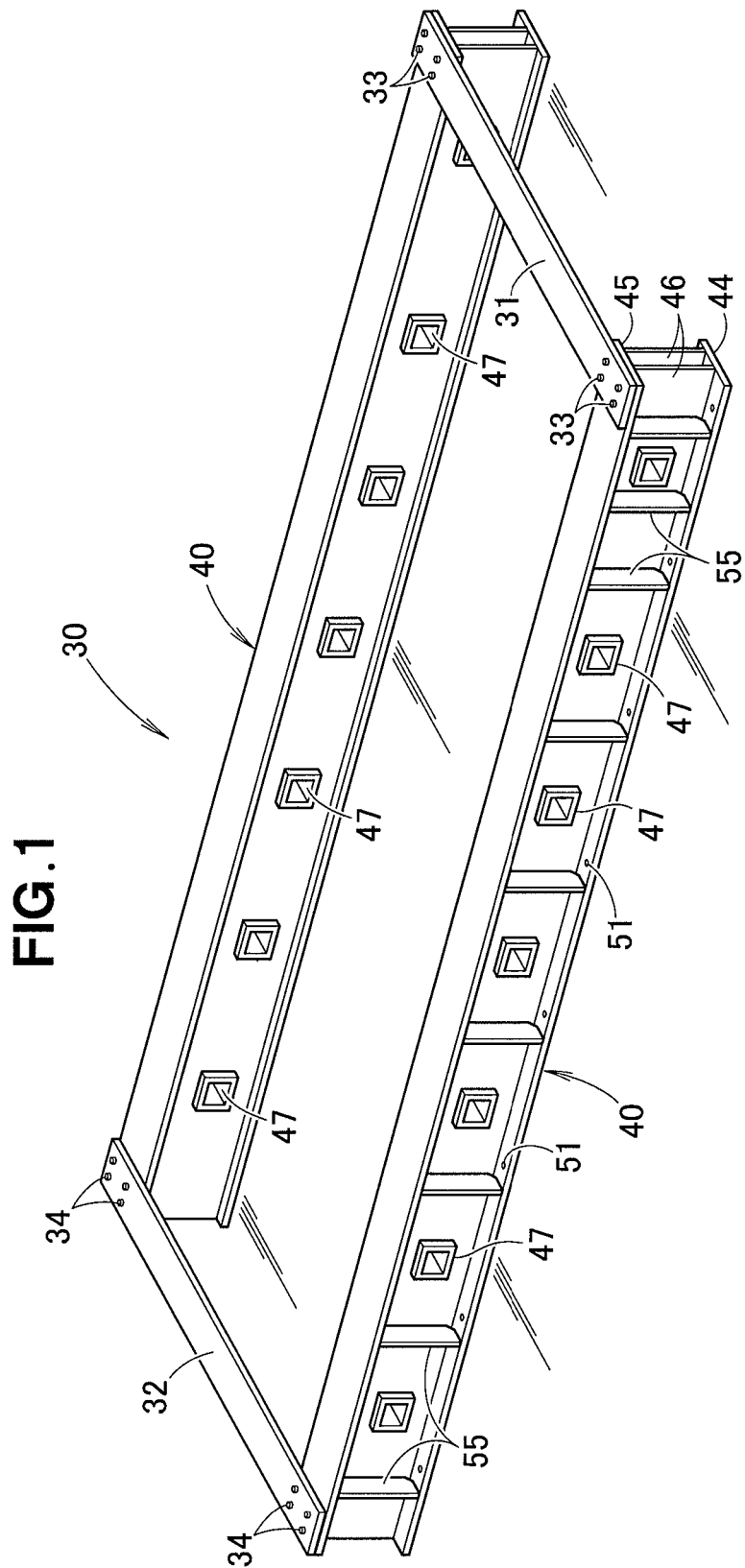
FIG. 1 is a perspective view of a base for an injection molding machine according to the present invention.

As illustrated in FIG. 1, a base 30 for an injection molding machine (hereinafter abbreviated as base) includes two right and left side frames 40,40 extending parallel with the axis of a mold opening/closing actuator (assigned with reference sign 16 in FIG. 2) being a drive actuator, a front cross member 31 connecting front ends of the two side frames 40,40, a rear cross member 32 connecting rear ends of the two side frames 40,40, bolts 33 fixing the front cross member 31 to the two right and left side frames 40,40, and bolts 34 fixing the rear cross member 32 to the two right and left side frames 40,40.

Since the bolts 33, 34 are used for fixing, the two side frames 40,40, the front cross member 31, and the rear cross member 32 can be manufactured separately. The two side frames 40,40, the front cross member 31, and the rear cross member 32 manufactured separately are transported to an installation site. At the installation site, the two side frames 40 are aligned, the front cross member 31 is placed on the front ends of the two side frames 40,40, and the rear cross member 32 is placed on the rear ends of the two side frames 40,40. After the two side frames 40, the front cross member 31, and the rear cross member 32 are placed in predetermined positions, the bolts 33 and bolts 34 are screwed.

The side frames 40 constitute a large portion of the base 30. When the side frames 40 have light weight, manufacturing cost and transportation cost of the base 30 can be reduced.

A structure for achieving weight reduction of the side frames 40 will be described with reference to FIGS. 3 and 4. First, usage of the base 30 and the side frames 40 will be described with reference to FIG. 2.

Figure 2:
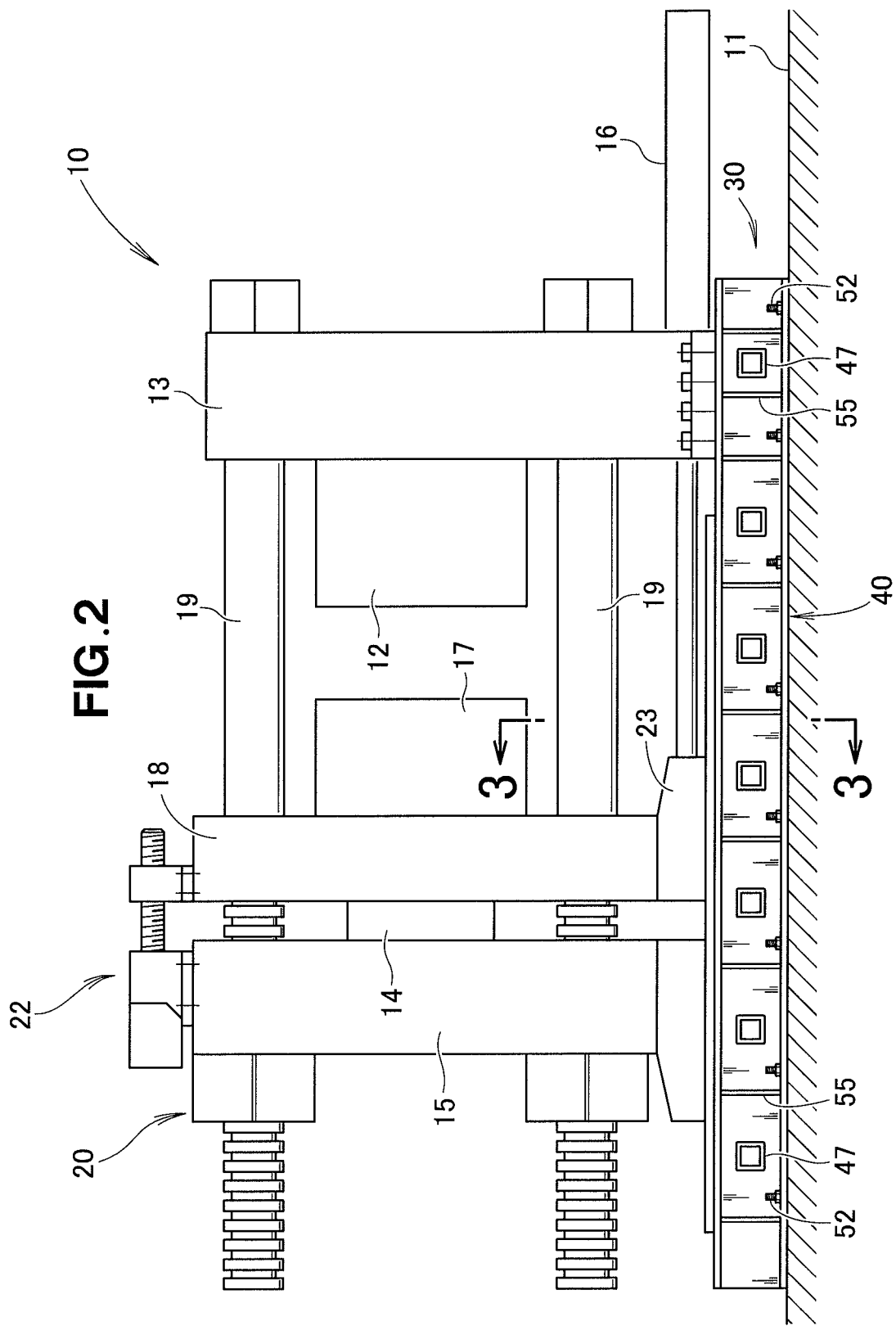
FIG. 2 is a front view of a mold clamping unit.

As illustrated in FIG. 2, a mold clamping unit 10 of the injection molding machine (hereinafter abbreviated as mold clamping unit) is a horizontal mold clamping unit including: the base 30 fixed to a bed 11 (or a substructure); a fixed platen 13 fixed to the base 30 and supporting a fixed mold 12; a mold clamping cylinder 15 movably disposed on the base 30; the mold opening/closing actuator 16 indirectly moving the mold clamping cylinder 15; a movable platen 18 being a movable body disposed between the fixed platen 13 and the mold clamping cylinder 15, supported by the base 30 in a horizontally movable manner, and supporting a movable mold 17; tie bars 19, 19 extending horizontally from the fixed platen 13 through the movable platen 18 and the mold clamping cylinder 15; a first coupling mechanism 20 coupling the mold clamping cylinder 15 with the tie bars 19, 19 when necessary; and a second coupling mechanism 22 mechanically coupling the mold clamping cylinder 15 with the movable platen 18.

The mold clamping cylinder 15 includes a piston rod 14 disposed parallel with the fixed platen 13 and extending toward the fixed mold 12. The piston rod 14 is coupled with the movable platen 18.

When the first coupling mechanism 20 is in an open state, the mold clamping cylinder 15 is released from the tie bars 19 and can be moved. When the first coupling mechanism 20 is in a closed state, the mold clamping cylinder 15 is coupled with the tie bars 19 and cannot be moved.

The second coupling mechanism 22 can mechanically couple the movable platen 18 with the mold clamping cylinder 15 (locked state) and uncouple the movable platen 18 from the mold clamping cylinder 15 (unlocked state).

In the locked state, the movable platen 18 and the mold clamping cylinder 15 are moved together, so that the mold opening/closing actuator 16 can move the movable platen 18 toward the fixed platen 13.

After the movable mold 17 comes into contact with the fixed mold 12, the first coupling mechanism 20 is changed from the open state to the closed state. In the closed state, the mold clamping cylinder 15 is fixed to the tie bars 19.

The second coupling mechanism 22 is changed into the unlocked state.

The piston rod 14 moves forward to clamp the molds. Thereafter, injection is performed, the molds are open, and then the resultant product is taken out.

Note that the mold clamping cylinder 15 may be substituted with a pressure receiving platen.

The pressure receiving platen is fixed to the base 30. The tie bars 19 are disposed across the pressure receiving platen and the fixed platen 13. A toggle link and a hydraulic cylinder are disposed between the pressure receiving platen and the movable platen 18 and used for clamping the molds.

Figure 3:
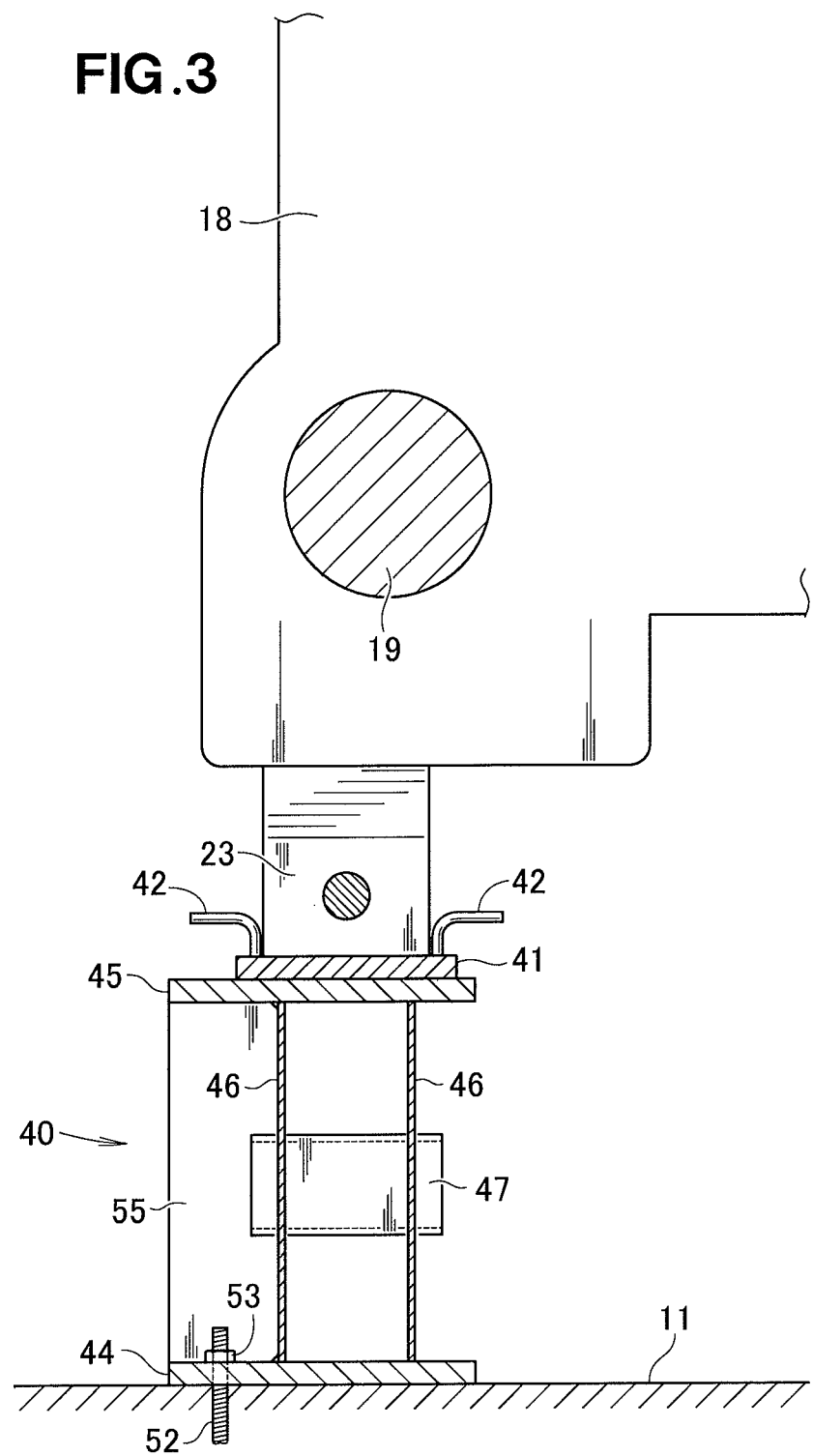
FIG. 3 is a cross-sectional view taken along the line 3-3 in FIG. 2.

As illustrated in FIG. 3, a foot member 23 called a shoe is disposed below the movable platen 18, and a slide plate 41 is disposed on the upper surface of the side frame 40. The foot member 23 moves in the front-rear direction of the drawing (the axial direction of the mold opening/closing actuator 16 in FIG. 2) while being in sliding contact with the slide plate 41.

Preferably, side guides 42, 42 are disposed on the slide plate 41, sandwiching the foot member 23. The foot member 23 is guided by the side guides 42, 42 and thus does not move in the lateral direction of the drawing.

Note that the slide plate 41 may be substituted with a rail, the foot member 23 may be substituted with a slider, and the slider may include steel balls. This structure is called a linear motion guide and reduces frictional resistance.

Figure 4:
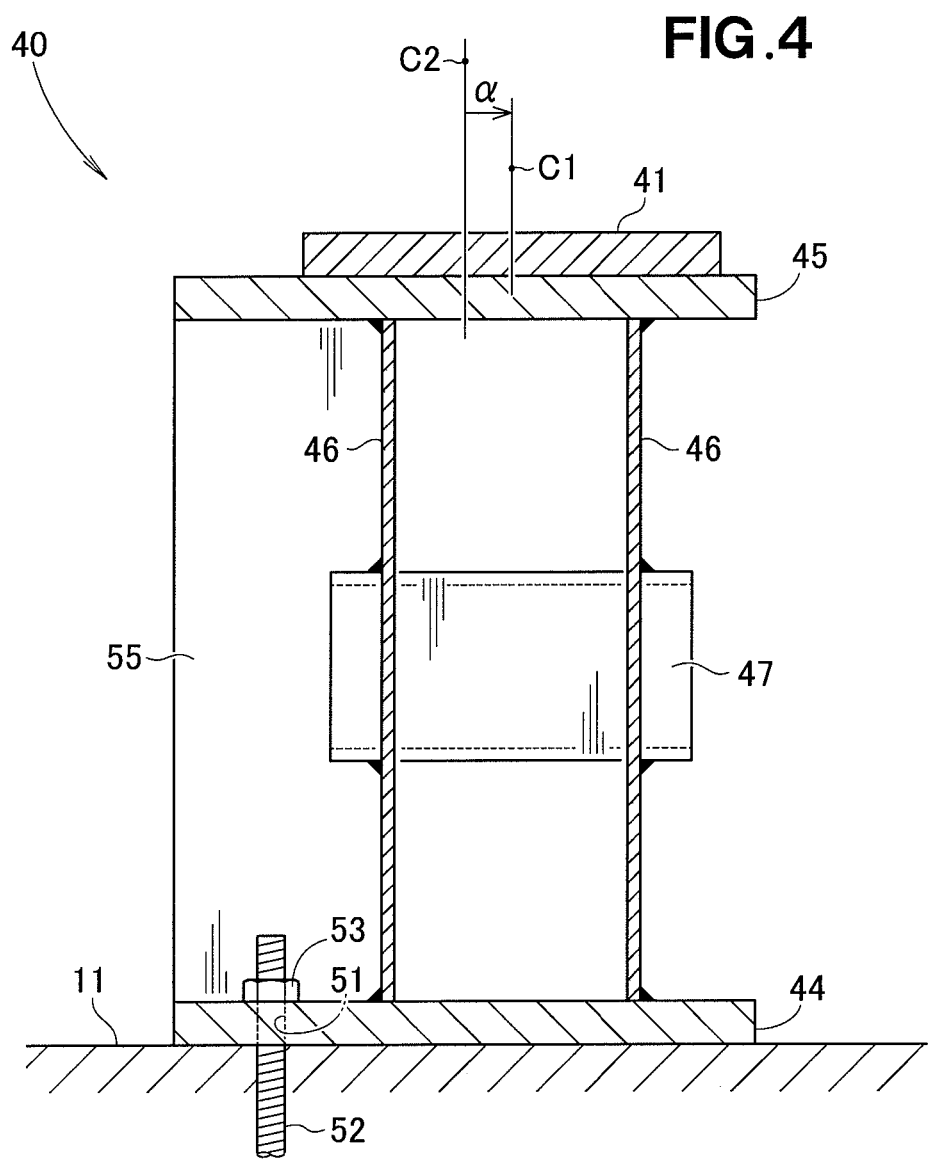
FIG. 4 is a cross-sectional view of a side frame.

As illustrated in FIG. 4, the side frame 40 includes a lower flange 44 supported by the bed 11 (or the substructure), an upper flange 45 disposed parallel with the lower flange 44, two webs 46,46 connecting the upper flange 45 and the lower flange 44, and web reinforcing members 47 fixed to the webs 46,46 while penetrating the webs 46,46.

Square pipes are suitably used as the web reinforcing members 47; however, round pipes may be used.

Action of the web reinforcing members 47 will be described with reference to FIGS. 5A and 5B.

FIG. 5A illustrates Comparative Example that includes no web reinforcing member 47. When a load F1 is applied to the upper flange 45, the webs 46,46 deform as illustrated with the phantom lines. When the webs 46,46 are thickened to prevent the deformation, the side frame 40 becomes heavier.

As illustrated in FIG. 5B, Example is provided with the web reinforcing member 47 connecting the webs 46,46. The web reinforcing member 47 can prevent deformation of the webs 46,46. Since the webs 46,46 are not required to be thickened, the side frame 40 remains lightweight.

As illustrated in FIG. 4, the lateral center C1 of the slide plate 41 (or the rail) is preferably positioned offset from the lateral center C2 of the upper flange 45 toward the center of the mold clamping unit (injection molding machine) by an amount a, in a cross-sectional view of the side frame 40.

The webs 46,46 are positioned in correspondence with the slide plate 41 (or the rail). In other words, each of the webs 46,46 is positioned such that the center of the group of the webs 46,46 (the center of the two webs) coincides with the lateral center C1 of the slide plate 41.

The offset by the amount α causes the lower flange 44 to extend outward. This extended portion is provided with anchor bolt holes 51. In other words, the anchor bolt holes 51 are positioned outside the outermost web 46 of the two webs 46,46, in the lower flange 44.

The anchor bolt holes 51 disposed on the outer side enable attachment of anchor bolts 52 and fastening of nuts 53 from the outer side, and thus the side frame 40 is readily fixed to the bed 11 or the substructure.

Note that the anchor bolts 52 are a generic name for bolts fixing the side frame 40 to the bed 11 (or the substructure) and may be general bolts.

Preferably, a rectangular stiffener 55 is disposed in a region defined by the upper surface of the lower flange 44, the outer surface of the outermost web 46, and the lower surface of the upper flange 45. The lower side of the stiffener 55 is welded to the lower flange 44, a lateral side (the right side in the drawing) of the stiffener 55 is welded to the outermost web 46, and the upper side of the stiffener 55 is welded to the upper flange 45.

The stiffener 55 is a plate-shaped reinforcing member that is disposed between the lower flange 44 and the upper flange 45 and that transmits a load applied to one of the lower flange 44 and the upper flange 45 to the other to prevent the lower flange 44 and the upper flange 45 from bending or deforming.

Action of the stiffener 55 will be described in detail with reference to FIGS. 6A and 6B.

FIG. 6A illustrates Comparative Example that includes no stiffener 55. When an upward force F2 is applied to the side, closer to the center of the mold clamping unit, of the lower flange 44 (a portion remote from the anchor bolt 52), the lower flange 44 slightly deforms from the anchor bolt 52 as illustrated with the phantom line. This deformation inclines the webs 46,46 as illustrated with the phantom lines.

FIG. 6B illustrates Example that includes the stiffener 55 in addition to the web reinforcing member 47. This configuration prevents the lower flange 44 from deforming and the webs 46,46 from being inclined.

Next, an example procedure for manufacturing the side frame 40 according to the present invention will be described with reference to FIGS. 7A to 7D.

In the drawings, beads formed in welding are illustrated by solid triangles, and welded beads are illustrated by hollow triangles.

As illustrated in FIG. 7A, the webs 46,46 are placed upright on the lower flange 44, and the webs 46,46 and the lower flange 44 are fixed to each other with beads B1. A welding rod 56 can be placed from the outer side, so that welding is readily performed. A coated welding rod is suitably used as the welding rod 56; however, a welding electrode may be used.

The web reinforcing member 47 is then inserted horizontally into holes 46a,46a opening in the webs 46,46.

As illustrated in FIG. 7B, both ends of the web reinforcing member 47 protrude from the webs 46,46. The welding rod 56 is placed from the outer side and welds the web reinforcing member 47 to the webs 46,46. The web reinforcing member 47 is fixed to the webs 46,46 with beads B2. The upper flange 45 is placed on the webs 46,46.

As illustrated in FIG. 7C, the upper flange 45 is fixed to the webs 46,46 with beads B3. The welding rod 56 can be placed from the outer side, so that welding is readily performed. The rectangular stiffener 55 is then inserted so as to come into contact with the outermost web 46, the lower flange 44, and the upper flange 45.

As illustrated in FIG. 7D, the stiffener 55 is fixed to the outermost web 46, the lower flange 44, and the upper flange 45 with beads B4. The welding rod 56 can be placed from the outer side, so that welding is readily performed.

The manufacturing procedure described with reference to FIGS. 7A to 7D is merely an example and may be modified appropriately.

Next, a manufacturing procedure in the case of three or more webs 46 will be described with reference to FIGS. 8A to 8D.

In FIGS. 8A to 8D, three webs 46 are illustrated as a first web 46A, a second web 46B, and a third web 46C for the sake of convenience. The first web 46A is placed outermost, the third web 46C is placed innermost, and the second web 46B is placed therebetween.

Figure 8A:
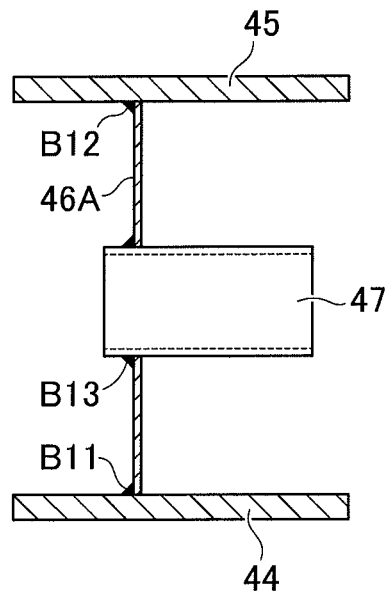
FIG. 8A is an explanatory diagram of processes from when webs are placed upright on a lower flange until when a web reinforcing member is inserted into the upright webs.

As illustrated in FIG. 8A, the first web 46A is fixed to the lower flange 44 with a bead B11, the upper flange 45 is fixed to the first web 46A with a bead B12, and the web reinforcing member 47 is fixed to the first web 46A with beads B13.

Figure 8B:
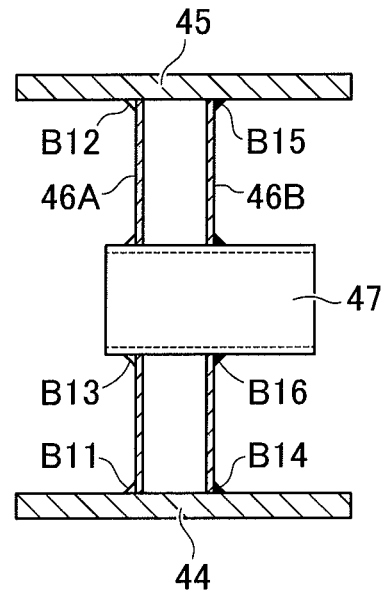
FIG. 8B is an explanatory diagram of processes until when the second web is attached.

Then, as illustrated in FIG. 8B, the second web 46B is positioned, fixed to the lower flange 44 with a bead B14, fixed to the upper flange 45 with a bead B15, and fixed to the web reinforcing member 47 with beads B16.

Figure 8C:
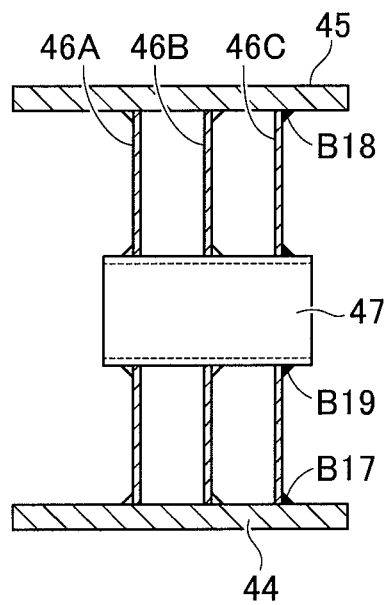
FIG. 8C is an explanatory diagram of processes until when the third web is attached.

Then, as illustrated in FIG. 8C, the third web 46C is positioned, fixed to the lower flange 44 with a bead B17, fixed to the upper flange 45 with a bead B18, and fixed to the web reinforcing member 47 with beads B19.

Figure 8D:
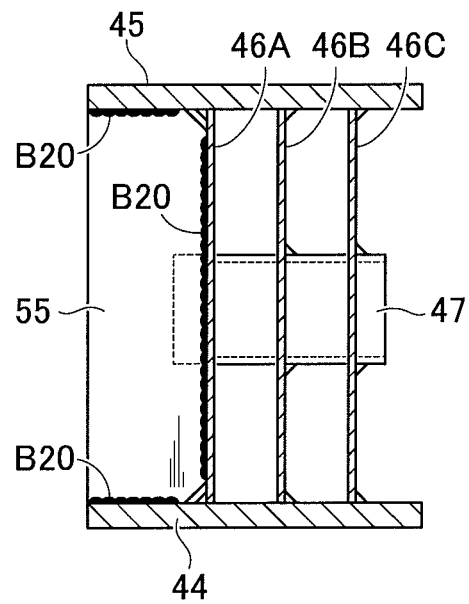
FIG. 8D is an explanatory diagram of a step of joining a stiffener.
Figure 9:
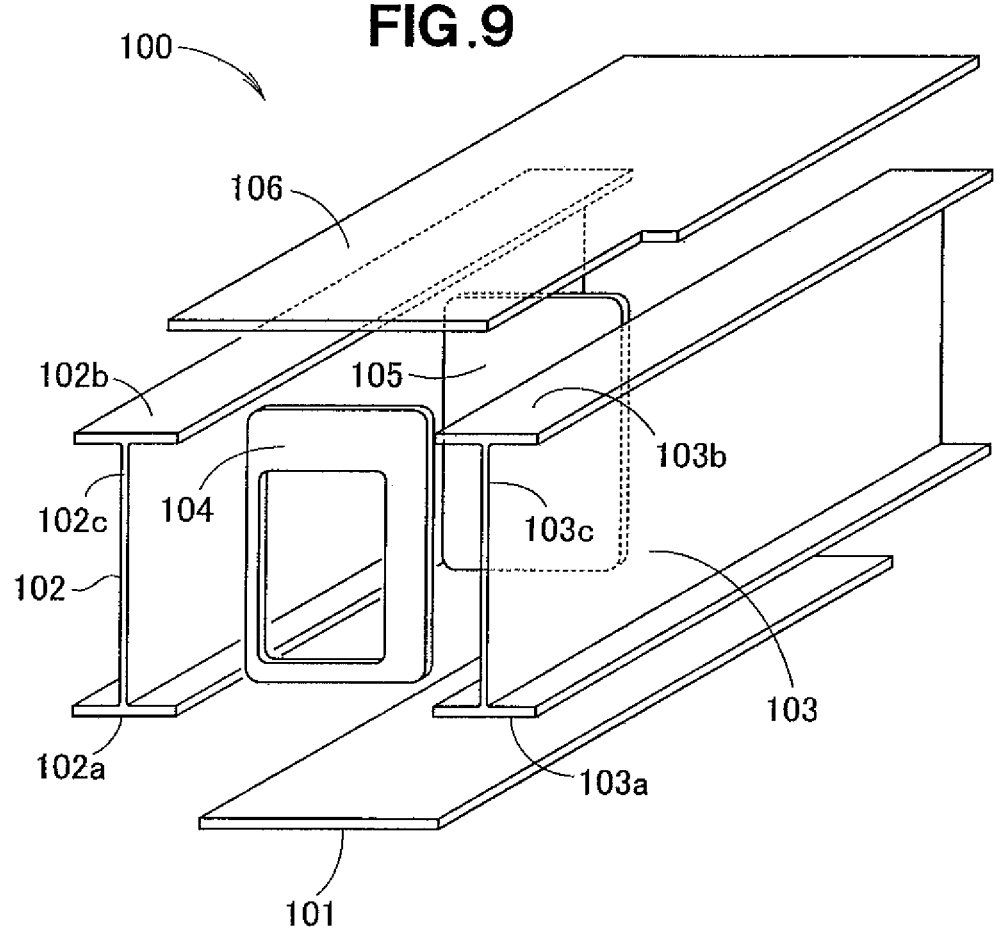
FIG. 9 is an exploded perspective view of a known base for an injection molding machine.
Figure 10:
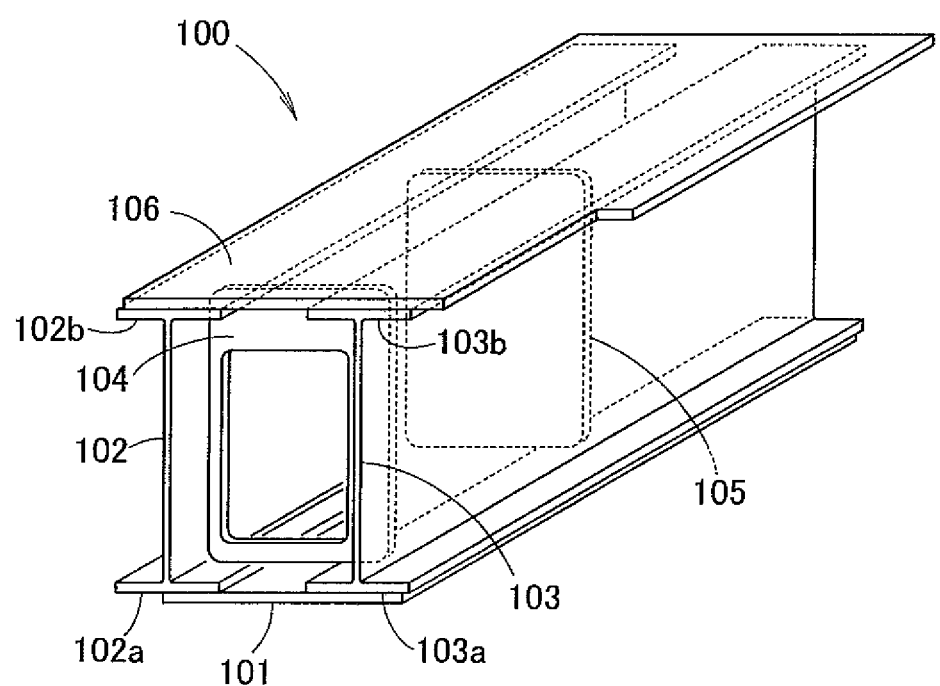
FIG. 10 is a perspective view of a known base for an injection molding machine.

As illustrated in FIG. 8D, the stiffener 55 is fixed to beads B20. The beads B11 to B20 can be readily welded by placing the welding rod from the outer side.

This manufacturing procedure enables manufacture of a side frame with four or more webs 46 as well as three webs 46.

The base 30 of the present invention is suitably used in a mold clamping unit of an injection molding machine but can also be applied to an injection unit of an injection molding machine, and is not limited to Example.

An injection unit of an injection molding machine includes, as the main elements, a movable table disposed on the base 30 in a horizontally movable manner, a heating barrel disposed on the movable table and including a screw therein, and an injection unit moving actuator moving the movable table so that a nozzle at the tip of the heating barrel is fit to a sprue of a fixed mold 12 and that the nozzle is separated from the sprue.

When the base is applied to the injection unit, the injection unit moving actuator corresponds to the drive actuator, and the movable table corresponds to the movable body.

Note that the stiffener 55 is a rectangular flat plate in Example, but may be a C-beam or a H-beam extending longitudinally other than the flat plate.

What is claimed is:

1. A base for an injection molding machine, the base for an injection molding machine comprising:
   two side frames extending parallel with an axis of a drive actuator;
   each of the two side frames comprising a lower flange supported by a bed, an upper flange disposed parallel with the lower flange, at least two webs connecting the upper flange and the lower flange, and a web reinforcing member fixed to the at least two webs while penetrating the at least two webs.

2. The base for an injection molding machine according to claim 1, wherein each side frame further comprises:
   a slide plate disposed on an upper surface of the upper flange and supporting a movable body moved by the drive actuator, the slide plate having a lateral center positioned offset from a lateral center of the upper flange toward a center of the injection molding machine, in a cross-sectional view of the side frame, and the at least two webs being positioned such that a center between two of the webs coincides with the lateral center of the slide plate;
   an anchor bolt hole positioned outside an outermost one of the at least two webs, in the lower flange; and
   a stiffener attached to the side frame and connected with an upper surface of the lower flange, an outer surface of the outermost web, and a lower surface of the upper flange.

3. An injection molding machine comprising:
   the base according to claim 2; and
   a mold clamping unit comprising:
   a fixed platen fixed to the base and supporting a fixed mold;
   a mold clamping cylinder movably disposed on the base;
   a mold opening/closing actuator indirectly moving the mold clamping cylinder;
   a movable platen disposed between the fixed platen and the mold clamping cylinder, supported by the base in a horizontally movable manner, and supporting a movable mold; and
   a tie bar extending horizontally from the fixed platen through the movable platen and the mold clamping cylinder,
   wherein the drive actuator is the mold opening/closing actuator, and the movable body is the movable platen.

4. The base for an injection molding machine according to claim 1, further comprising:
   a front cross member connecting front ends of the two side frames; and
   a rear cross member connecting rear ends of the two side frames.

* * * * *